US006794044B2

(12) United States Patent
Jones et al.

(10) Patent No.: US 6,794,044 B2
(45) Date of Patent: Sep. 21, 2004

(54) CHROMATOGRAPHIC PACKING MATERIALS AND METHODS OF MAKING AND USING SUCH PACKING MATERIALS

(75) Inventors: Brian A. Jones, South Jordan, UT (US); Nathan L. Porter, West Jordan, UT (US)

(73) Assignee: Selerity Technologies, Inc., Salt Lake City, UT (US)

( * ) Notice: Subject to any disclaimer, the term of this patent is extended or adjusted under 35 U.S.C. 154(b) by 0 days.

(21) Appl. No.: 10/091,379

(22) Filed: Mar. 4, 2002

(65) Prior Publication Data

US 2002/0146574 A1 Oct. 10, 2002

Related U.S. Application Data

(60) Provisional application No. 60/272,866, filed on Mar. 2, 2001.

(51) Int. Cl.$^7$ .............................................. B32B 25/20
(52) U.S. Cl. ....................................... 428/447; 428/391
(58) Field of Search ................................. 428/391, 447

(56) References Cited

U.S. PATENT DOCUMENTS

| | | | |
|---|---|---|---|
| 3,722,161 A | | 3/1973 | Kirkland et al. |
| 3,795,313 A | | 3/1974 | Kirkland et al. |
| 4,318,819 A | | 3/1982 | Malloy et al. |
| 4,539,399 A | | 9/1985 | Armstrong |
| 4,590,167 A | | 5/1986 | Gunther et al. |
| 4,619,984 A | | 10/1986 | Yuki et al. |
| 4,634,755 A | | 1/1987 | Hallgren et al. |
| 4,705,725 A | | 11/1987 | Glajch et al. |
| 4,746,572 A | | 5/1988 | Glajch et al. |
| 4,778,909 A | | 10/1988 | Karger et al. |
| 4,828,695 A | | 5/1989 | Yamamura et al. |
| 4,837,348 A | | 6/1989 | Stolowitz et al. |
| 4,874,518 A | | 10/1989 | Kirkland et al. |
| 4,876,595 A | | 10/1989 | Veldhuis |
| 4,895,968 A | | 1/1990 | Buese et al. |
| 4,996,343 A | | 2/1991 | Karger et al. |
| 5,158,758 A | | 10/1992 | Chieng et al. |
| 5,194,333 A | * | 3/1993 | Ohnaka et al. ............. 428/405 |
| 5,260,377 A | | 11/1993 | Weber et al. |
| 5,374,755 A | | 12/1994 | Neue et al. |
| 5,439,979 A | | 8/1995 | Mack et al. |
| 5,576,453 A | | 11/1996 | Buese |
| 5,667,674 A | | 9/1997 | Hanggi et al. |
| 5,861,110 A | | 1/1999 | Chieng et al. |
| 5,869,152 A | | 2/1999 | Colon |
| 5,869,724 A | | 2/1999 | Kirkland et al. |
| 5,948,531 A | | 9/1999 | Kirkland et al. |
| 5,968,652 A | | 10/1999 | Hanggi et al. |
| 6,057,468 A | | 5/2000 | Kirkland et al. |
| 6,136,438 A | | 10/2000 | Menyes et al. |
| 6,489,030 B1 | * | 12/2002 | Wu et al. ................... 428/447 |
| 2002/0009603 A1 | * | 1/2002 | McGill et al. .............. 428/447 |
| 2002/0198353 A1 | * | 12/2002 | Chen et al. .................. 528/10 |

FOREIGN PATENT DOCUMENTS

EP  129074  12/1984
JP  11335462  12/1999

OTHER PUBLICATIONS

Dagger et al., "Studies of cyclic and linear poly(dimethylsiloxanes): 34 Preparation, fractionation and characterisation of the first per–deuterated macrocyclic poly(dimethylsiloxanes)", Polymer 1999, pp. 3243–3245, vol. 40 Issue 11.
Snyder et al., "An Introduction to Modern Liquid Chromatography" 1979, Chapter 7 pp. 197–237, John Wiley & Sons, New York, New York.
Lork et al., "Role of the functional group in n–Octyldimethylsilanes in the synthesis of C8 reversed–phase silica packings for high–performance liquid chromatography", Journal of Chromatography 1986, vol. 352, pp. 199–211, Amsterdam.
Welsch et al., "Characterization of a new dehydroxylated reversed–phase material", Journal of Chromatography 1983, vol. 267, p. 39–48, Amsterdam.
Jones et al., "Characterization and evaluation of cyanopropyl polysiloxane stationary phases for gas chromatography", Journal of Chromatography 1984, vol. 298, p. 389–397, Amsterdam.
Kirkland et al., "Bidentate Silane Stationary Phases for Reversed–Phase High–Performance Liquid Chromatography", Analytical Chemistry 1998, vol. 70, Issue 20, pp. 4344–4352.
Kirkland et al., "Reversed–phase high–performance liquid chromatography of basic compounds at pH 11 with silica–based column packings", Journal of Chromatography 1998, vol. 797, Issues 1–2, pp. 111–120, The Netherlands.
Boksanyi et al., "Chemically Modified Silicon Dioxide Surfaces", Advances in Colloid and Interface Science 1976, vol. 6, p. 95, The Netherlands.
Deschler et al., "3–Chloropropyltrialkoxysilanes–Key Intermediates for the commercial production of organofunctionalized silanes and polysiloxanes", Agnew Cheme. Int. Ed. Engl. 1986, vol. 25, p. 236–252, Weinheim.
U.S. patent application No. 10/967,066, published on Apr. 3, 2003 as US–2003–0061867.

* cited by examiner

Primary Examiner—Jeffrey B. Robertson
(74) Attorney, Agent, or Firm—Kenneth E. Horton; Kirton & McConkie

(57) ABSTRACT

Increased stability of derivitization agents on the surfaces of packing material used in choromatography is described. In particular, the stability of the organosilanes on silicia surfaces used in chromatography is increased, thereby creating a more durable coating of organosilanes. By increasing its stability, the organosilane entity becomes more resistant to de-bonding and the durability of the underlying surface is enhanced against dissolution. Thus, chromatographic separations are able to be performed at higher and lower pH ranges and higher temperatures. The stability can be increased through attachment of polydentate silanes which are either pre-polymerized and then surface bonded or can be bonded first and then cross-polymerized afterward, yielding a polymerized polycarbosilane backbone that is very stable against hydrolytic cleavage conditions.

29 Claims, 3 Drawing Sheets

US 6,794,044 B2

CHROMATOGRAPHIC PACKING MATERIALS AND METHODS OF MAKING AND USING SUCH PACKING MATERIALS

REFERENCE TO RELATED APPLICATIONS

This application claims priority from U.S. provisional patent application No. 60/272,866 filed on Mar. 2, 2001, the entire disclosure of which is incorporated herein by reference.

FIELD OF THE INVENTION

The invention generally relates to packing materials and their use in chromatography. In particular, the invention relates to packing materials and their use in High Performance Liquid Chromatography (HPLC). More particularly, this invention relates to a process for increasing the stability and durability of organosilanes on the surfaces of silica packing materials that are used in HPLC.

BACKGROUND OF THE INVENTION

In recent years there has been an increasing emphasis on using chromatography, especially HPLC, for analyzing mixtures by separating their components. HPLC is an efficient tool that is widely used throughout the analytical community. Typically, as shown in FIG. 3, an HPLC separation is performed with an instrument containing solvent reservoir 1, pump 2, injector 3, stainless steel tubing 4, column oven 5, column 6, UV detector 7, data system 8, and backpressure regulator 9. It recently has been found beneficial to heat the separation column to increase the speed of analysis.

Using the solvent reservoirs, pumps, mixing unit, and injection device, a sample of a material to be analyzed is injected in a flow of an appropriate solvent going through the chromatographic column (containing the packing material). The various components of the sample are separated in the column due to adsorption, absorption, size exclusion, ion exchange, or other interactions with the packing material. The separated components are then detected using the detector. Some detectors that are commonly used include ultraviolet absorption, fluorescence, refractive index, conductivity, electrochemical, mass spectrometry and evaporative light scattering. The data obtained is then processed with an integrator or computerized data system.

One widely used packing material in chromatographic columns is based on silica. One common type of silica packing material contains a lipophilic modified surface for use in reversed-phase separations. Common lipophilic agents used in the derivatization process include reactive organosilanes, including chlorodimethyloctadecylsilane. The silica contains silanol groups on its surface and when the derivatization process uses reactive silanes, some of the silanol groups on the surface of the silica do not react with the silanes.

Typically, up to 50% of the silanol groups remain unreacted during the derivatization of the silica. These residual silanol groups interact—usually through ion exchange, hydrogen bonding, and dipole/dipole mechanisms—with the sample material being analyzed, especially with acidic or basic samples. These unreacted silanol groups can create problems during analysis, including problems ranging from increased retention, to excessive tailing and irreversible adsorption of the sample. In addition, they can provide points of degradation of the silica itself through attack from mobile phase components. One role of the lipophilic organosilane derivatization is to shield the silica surface from dissolution by mobile phase components. Gaps in surface coverage provide access for the mobile phase to dissolve the underlying silica or detach the lipophilic silanes and sweep them away.

There have been numerous attempts to overcome the problems caused by the presence of these unreacted silanol groups. Some approaches have been based on modifying the silica itself, e.g., using ultrapure silica, carbonized silica, or coating the silica surface with a polymeric composition. Other approaches have been based on modifying the separation process, e.g., by adding suppressors (such as long chain amines) to the eluent used in the separation process. Yet other approaches have been based on modifying the unreacted silanol groups, e.g., endcapping the residual silanol groups with different types of silanes such as bidentate silanes; polymeric silanes; highly reactive monomeric silanes; silanes containing 1 to 3 organic groups; and silanes containing various leaving groups like halogens, triflates, alkoxy, acyl, oximes, amines or amine salts. See, for example, Dagger et al. *Polymer* 40(11) pp. 3243–3245 (1999); Chapter 7 of *An Introduction to Modern Liquid Chromatography* John Wiley & Sons, New York, N.Y. (1979); *J. Chromatogr.* 352, 199 (1986); *J. Chromatogr.* 267, 39 (1983); *J Chromatogr.* 298, 389 (1984); *Anal. Chem.* 70(20) pp. 4344–4352 (1998); *J. Chromatogr.* 797 (1–2) pp. 111–120 (1998); *Advances in Colloid and Interface Science* 6, 95 (1976); Angew *Cheme. Int. Ed. Engl.* 25, 236 (1986); Walter et al. *Advances in Silica Technology for Reserved-Phase HPLC Packings HPLC 99*; as well as EP Patent Application No. 129,074, JP Patent Application No. (Kokai) 11335462, and U.S. Pat. Nos. 6,136,438, 6,057,468, 5,968,652, 5,948,531, 5,869,724, 5,869,152, 5,861,110, 5,667,674, 5,576,453, 5,439,979, 5,374,755, 5,2670,377, 5,158,758, 4,996,343, 4,895,968, 4,876,595, 4,874,518, 4,837,348, 4,828,695, 4,778,909, 4,746,572, 4,705,725, 4,634,755, 4,619,984, 4,539,399, 4,318,819, 4,590,167, 4,539,399, 3,795,313, and 3,722,181, the entire disclosures of which are incorporated herein by reference.

Unfortunately, none of these approaches has been completely satisfactory. In particular, none of these approaches have produced organosilane modified particles stable enough to allow their use in chromatography under pH extremes or elevated temperature conditions.

SUMMARY OF THE INVENTION

The invention provides increased stability of derivitization agents on the surfaces of packing material used in chromatography. In particular, the invention increases the stability of the organosilanes on silicia surfaces used in chromatography, thereby creating a more durable coating of organosilanes. By increasing its stability, the organosilane entity becomes more resistant to de-bonding and the durability of the underlying surface is enhanced against dissolution. Thus, chromatographic separations are able to be performed at higher and lower pH ranges and higher temperatures.

The stability can be increased through attachment of polydentate silanes which may be formed by pre-polymerization of suitable monomers followed by surface bonding, or by first bonding reactive monomers with appropriate functionality to the surface, followed by cross-polymerization into polycarbosilanes that are very stable against hydrolytic cleavage conditions. The stability can also be increased through attachment of polydentate silanes which are either pre-polymerized and then surface bonded or can be bonded first and then cross-polymerized afterward, yielding a polymerized polycarbosilane backbone that is very stable against hydrolytic cleavage conditions.

BRIEF DESCRIPTION OF THE DRAWINGS

FIGS. 1–3 are views of one aspect of the chromatographic packing material and methods of making and using such packing materials according to the invention, in which:

FIG. 1 illustrates a capillary SFC analysis tracking the progress of a reaction in one aspect of the method of the invention;

FIG. 2 illustrates a reaction scheme in one aspect of the method of the invention; and FIG. 3 illustrates a chromatographic apparatus in one aspect of the method of the invention.

FIGS. 1–3 illustrate specific aspects of the invention and are a part of the specification. Together with the following description, the Figures demonstrate and explain the principles of the invention.

DETAILED DESCRIPTION OF THE INVENTION

Figure 1:
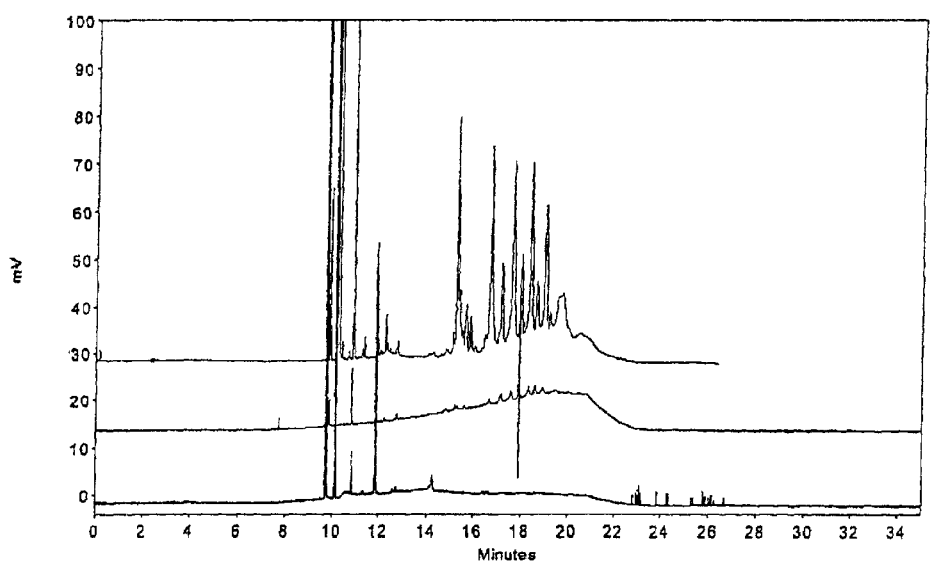

The following description provides specific details in order to provide a thorough understanding of the present invention. The skilled artisan, however, would understand that the invention can be practiced without employing these specific details. Indeed, the invention can be practiced by modifying the illustrated method and resulting product and can be used in conjunction with apparatus and techniques conventionally used in the industry. For example, the invention could be used to modify similar surfaces other than silica, such as zirconia, alumina, or other metal oxides. In addition, the invention could be used to create stable organosilane coatings for non-chromatographic applications.

Any suitable type of silica material or other metal oxide known in the art can be used as the packing material in this invention. Mixtures and combinations of different materials, including hybrid materials made by surface modification with other metal oxides can also be employed in this invention. In one aspect of the invention, chromatographic-grade silica is used as the packing material in the invention. In yet another aspect of the invention, surfaces of tubing or other objects made from or containing metal oxides can also serve as substrates for coating with polydentate silanes.

In one aspect of the invention, the stability of organosilanes on inorganic(silica) surfaces is improved by attachment of silane compounds which are pre-polymerized into polycarbosilanes with remaining active functionality towards silanol groups and then surface bonded. In another aspect of the invention, reactive silane monomers bearing suitable functionality are surface bonded and then cross-polymerized afterward, yielding a bonded polycarbosilane material that is very stable against hydrolytic cleavage conditions.

As described above, silane compounds (and in particular organosilane compounds) can be attached or bonded to the silica surfaces used as the packing material in chromatographic columns using various methods. In one method of the invention, the organosilanes are attached to the silica surface using reactive monomeric compounds that are precursors to the polymeric organosilanes. In this method, a stable leaving group from the reactive monomer is released when it contacts the silanol groups on the silica surface. As well, hydrogen from silanol groups on the silica surface are released. As the hydrogen from the silanol and the leaving group from the monomer are released, the reactive monomer is attached or bonded to the silica surface and forms the bonded organosilane. The result is a modified silica surface to which the organosilanes are attached. The organosilanes are attached with a density such that remaining silanol groups are prevented from further reaction due to steric hindrance from those organosilanes already bonded to the silica surface. The resulting multiple point attachment of the polycarbosilanes to the silica surface greatly increases their resistance to debonding reactions over silanes bonded with just one or two attachment points. The spacer groups between the silicon atoms in the polycarbosilanes also further shield the underlying silica surface from reacting with mobile phase components.

Reactive monomers that can be employed in the invention include any monomer that reacts sufficiently for the attachment process to occur. Generally, the more reactive the monomer, the more the reaction underlying the attachment process is driven to completion. The monomer itself is a molecule or compound containing carbon and silica and is usually of relatively low molecular weight and simple structure that is capable of conversion to polymers. In one aspect of the invention, the monomer also contains the leaving group.

Any reactive monomer meeting the above criteria can be employed in the invention. Suitable reactive monomers include those containing 1 to 3 groups with carbon and/or hydrogen bonded to silica, and also those containing leaving groups like halogens, triflates, alkoxy, acyl, oximes, amines or amine salts. Mixtures and combinations of these monomers can also be employed in the invention. In one aspect of the invention, n-octylallylchlorosilane is employed as the reactive monomer.

As described above, the reactive monomers form bonded silane compounds on the silica surface. The type of silane compound bonded to the silica depends on the reactive monomer used. Silane compounds are chemical compounds containing silicon and combinations of other elements. Organosilanes are chemical compounds containing silicon, carbon, and combinations of other elements. Exemplary silane compounds useful in chromatography include bidentate silanes; polymeric silanes; reactive monomeric silanes; silanes containing 1 to 3 organic groups; and silanes containing leaving groups like halogens, triflates, alkoxy, acyl, oximes, amines or amine salts. Preferably, organosilane compounds are used in this aspect of the invention. More preferably, n-octylallylchlorosilane is used as the organosilane in the invention. Mixtures and combinations of the above silanes can also be used.

As discussed above, most bonding schemes involve attaching silanes (such as organosilanes) to silica surfaces through reactive monomers, where a stable leaving group is released in contact with surface silanols. As discussed above, gaps remain in the organosilane coating that can lead to undesirable results. For example, the organosilane coating can be attacked by active moieties in the mobile phase during the chromatography process and at low pH conditions, the organosilane monofunctional bonded phases can be removed rather quickly.

To improve this stability, it is known to create multifunctional bonded silanes with a degree of polymerization above the silica surface using siloxane linkages. The extent to which this polymerization occurs can depend on the amount of water present, which may be deliberately added or may be present as a hydrogen bonded layer on the solid silica surface. But by increasing the polymerization, the number of electronegative oxygen atoms also increases. And with more electronegative oxygen atoms on the organosilanes, the silicon atom in the silica becomes more positively charged and, therefore, is more susceptible to degrading attack by high pH mobile phases.

Some limited shielding can be achieved by using mixed trifunctional silanes. The short chain length spacer silane in such trifunctional silane compounds helps link the longer chain entities while providing shielding of the siloxane backbone. In another example, bidentate silanes (generally containing monofunctional silanes linked with hydrocarbon or other types of spacers) have been used for such bonding. When bidentate silanes have been used, the resulting silica had the benefit of two silane attachment points on the silica surface, keeping the number of electronegative groups attached to the silicon atoms lower.

Other attempts to increase the stability have focused on generating a polymeric network containing a polycarbosilane structure. For example, silanes with multiple olefinic substituent groups (such as vinyl, allyl, and butenyl), have been bonded to an inorganic oxide surface through reaction with a SiCl or SiOR group and then polymerized into polycarbosilanes using free radicals. While these materials were strongly resistant to hydrolytic cleavage, their reactivity is random, leaving some of the bonded silanes unattached to any other silanes. See, for example, U.S. Pat. Nos. 5,667,674, 4,876,595, and 5,968,652. Other polycarbosilane materials have olefinic and silicon hydride polymers crosslinked through hydrosilation, but the reactive sites for bonding to the surface were not incorporated. See, for example, U.S. Pat. No. 5,2670,377.

In the invention, the advantages of dual point attachment are extended into the range of 3 or more attachment points by increasing the size of the silane compound. At the same time, the amount of electronegative groups is not increased, e.g., each silicon atom still bears only one electronegative group. Thus, a lower tendency towards nucleophilic attack and subsequent breakdown can be achieved.

In this aspect of the invention, these advantages are obtained by using polydentate silanes in place of bidentate silanes (such as those described in U.S. Pat. Nos. 5,869,724 and 5,948,531, the entire disclosures of which are incorporated herein by reference). Any polydentate silane can be employed in the invention with a repeating structure —Si—(C)x—, and bearing other additional functionality to impart the desired chromatographic selectivity and performance to the finished product. In one aspect of the invention, polycarbosilanes are preferably employed in the invention, including polycarbosilanes with one, two, or more carbon spacers. More preferably in this aspect of the invention, a polycarbosilane with a three carbon spacer is employed in the invention. In one aspect of the invention, the polydentate silanes have the molecular formula (I):

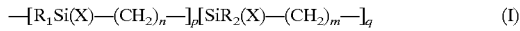
$$-[R_1Si(X)-(CH_2)_n-]_p[SiR_2(X)-(CH_2)_m-]_q \quad (I)$$

where $R_1$ is an alkyl or aryl group having from 1 to 30 carbon atoms, $R_2$ is an alkyl or aryl group having from 1 to 30 carbon atoms and may be the same or different than $R_1$, $R_1$ or $R_2$ include a functional group similar to —$(CH_2)_3$—$N^+Cl^-$, —$(CH_2)_2$—$(C_6H_4$—$(CH_2)_3$—$C_6H_4$—$SO_3H$, —$(CH_2)_3$—$O$—$CH_2$—$CHOH$—$CH_2OH$, —$(CH_2)_3$—$NH_2$, and —$(CH_2)_3$—$CN$, n is an integer from 1 to 10, m is an integer from 1 to 10, p and q are integers from 0 to 100 (except where p+q=2 and where p+q=0), and X is a leaving group as described herein.

The monomers for the polydentate silanes can be synthesized such that variations in the spacer length can be constructed to the desired specifications. As the monomers only link in one orientation during a hydrosilation process (where an SiH group adds across a single bond), control over the spacer length can be maintained. Thus, unlike polymerization of olefinic groups to form polycarbosilanes containing randomization in the final product, the invention can control the spacer length in the organosilane.

The monomers can be prepared in any manner known in the art, with the following non-limiting example being representative of one possible preparation route. First, a suitable amount of an appropriate precursor compound is reacted with a suitable amount of Grignard reagent bearing the desired functionality. For example, to obtain allyloctylchlorosilane, about 18.26 grams distilled allyldichlorosilane was combined with about 27.5 grams anhydrous tetrahydrofuran, followed by cooling under a dry nitrogen blanket to −78° C. in a dry ice-acetone bath. A 73 ml solution of n-octylmagnesium chloride (1.77M in tetrahydrofuran) was then slowly added under vigorous stirring. The mixture was allowed to warm to room temperature over two hours.

Next, the monomer is worked up by any suitable procedure. For example, dry pentane (100 ml) was added to precipitate the salts. The salts were removed by filtration and the final product distilled under reduced pressure to give a colorless oil. The yield was 19.4 grams, a yield of about 68% of theoretical. Purity of the final product was verified by capillary supercritical fluid chromatography using an SB-Phenyl-5 column.

The monomers are then polymerized by any suitable procedure known in the art to obtain the polymerized silane. In one aspect of the invention, the monomers can be polymerized by combining 2 grams of the monomer with 10 ml of dry toluene in a vial under nitrogen. Then, the mixture was heated to 95° C. and about 100 ppm of chloroplatinic acid was added via an ethanol/tetrahydrofuran solution containing the acid. Then, samples of the reaction mixture were taken and analyzed by any suitable method, e.g., for example by capillary supercritical fluid chromatography (SFC).

FIG. 1 illustrated the progress of the polymerization reaction to obtain the polydentate silane. FIG. 1 depicts several chromatograms overlaid such that composition changes were readily visible as the polymerization reaction proceeded. The large peak eluting at 11.8 minutes corresponds to the allyloctylchlorosilane starting material. As it polymerized via hydrosilation, the peak distribution corresponding to a growing concentration of linear and cyclic polycarbosilanes appeared (with elution starting at 15.2 minutes) and continued beyond 20 minutes when the SFC system reached its maximum pressure. After six hours of reaction, very little monomeric starting material remained. It was determined through multiple polymerizations with this monomer that repeatable product distributions could be obtained.

The silica packing material can be purified by any mechanism known in the art. In many instances, such as when chromatographic grade silica is used, the silica is already pure enough and the purification stage can be omitted. Second, the silica is dried using any known drying process that does not damage the silica. In one aspect of the invention, the silica is dried under a vacuum at 250 degrees Celsius to a constant weight to remove water from the surface of the silica. Any similar drying process that removes substantially all the water from the silica surface can be employed in the invention.

Figure 2:
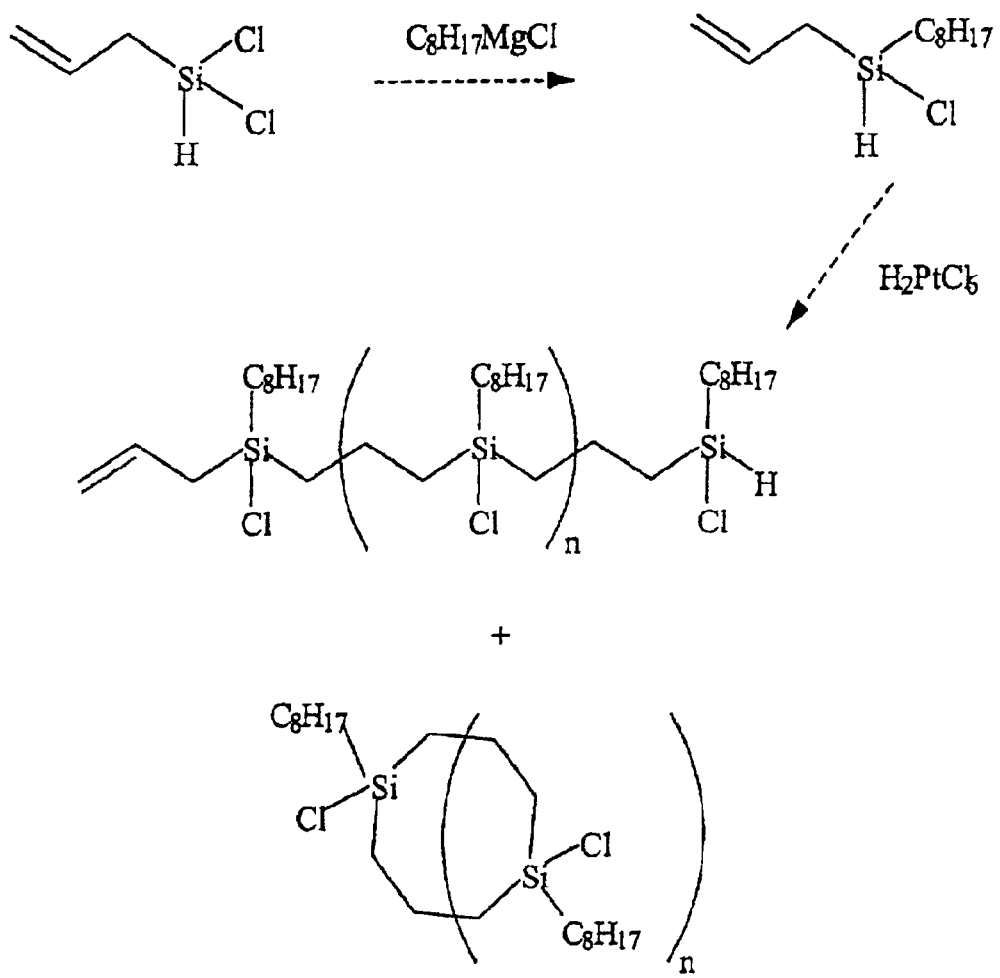
Figure 3:
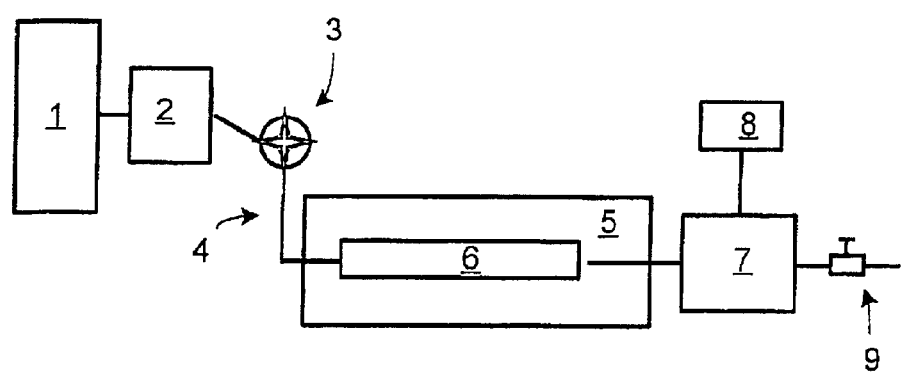

The resulting polymerized polydentate silane is then attached/bonded to the silica using any known procedure. In one aspect of the invention, the reaction scheme illustrated in FIG. 2 is employed in the invention. To carry out this reaction scheme, the polydentate silane is reacted with dried chromatographic grade silica (2 grams, 100 angstroms, 5 μm particles) while using 2 grams of dry pyridine as an acid scavenger. The resulting material is then heated at 110° C. for 16 hours, filtered, washed with methylene chloride, washed with acetone, and finally washed with acetonitrile/water (65:35) mixture. Next, the silica was dried under vacuum and treated with a 5% solution of trimethylsilyl triflate/lutidine (1:3) mixture in methylene chloride. The mixture was stirred for two hours and then filtered and washed with methylene chloride, acetone, and finally acetonitrile/water (65:35) mixture.

The resulting silica has a carbon loading percentage ranging from about 9 to about 15%. In one aspect of the invention, the silica has a carbon loading percentage of about 13.2%. This loading was higher than other $C_8$ materials prepared using monomeric reagents with the same silica, but was not indicative of build-up of a thick polymeric layer.

The resulting silica was comparable or superior to commercially-available silica in several aspects. Analytical runs were made on columns packed with treated silica particles of the invention using the NIST 870 test mixture at 23° C. after exposure to the methanol/water flow of 16 hours each at 50°, 60°, 70°, 80°, 90°, 100° and 110° C. The retention characteristics and selectivity were consistent with a well-deactivated alkyl-substituted silica packing material.

The treated silica particles of the invention generally had superior stability when compared to bidentate-bonded silica from Agilent Technologies sold as Extend™. Specifically, the silica materials of the invention exhibited a considerably higher resistance toward breakdown and extended lifetimes in the presence of hydrolytic solvents at elevated temperatures. To test the stability characteristics, columns were packed with the silica particles of the present invention and the Agilent Extend™ particles. The columns were subjected to flow at elevated temperatures with mixtures of methanol and water. The Agilent Extend™ material failed after 1000 column volumes had passed through at 50° C. In contrast, silica particles treated with polydentate silanes as described above withstood 1000 column volumes at 50, 60, 70, 80, 90, 100 and 110° C., finally showing signs of degradation (evidenced by increased backpressure and diminished analytical performance) after exposure to extended flow at 120° C. with methanol/water.

Having described the preferred embodiments of the invention, it is understood that the invention defined by the appended claims is not to be limited by particular details set forth in the above description, as many apparent variations thereof are possible without departing from the spirit or scope thereof.

We claim:

1. A metal oxide material, comprising:
    a metal oxide substrate; and
    a coating comprising an organosilane polymer and having an improved durability, the organosilane polymer bonded to a portion of the substrate through at least 3 attachment points.

2. The metal oxide of claim 1, the organosilane comprising a polycarbosilane compound.

3. The metal oxide of claim 2, wherein the polycarbosilane compound is derived from a monomer containing a leaving group selected from halogens, triflates, alkoxy, acyl, oximes, amines, amine salts, or combinations or mixtures thereof.

4. The metal oxide of claim 3, wherein the monomer is alkyl substituted or aromatic substituted.

5. The metal oxide of claim 1, wherein the coating is very stable against hydrolytic cleavage conditions.

6. The metal oxide of claim 1, wherein the metal oxide is silica, titania, zirconia, or a combination thereof.

7. The metal oxide of claim 1, wherein the metal oxide is silica.

8. The metal oxide of claim 7, wherein the silica is used as a packing material or a support material in chromatography.

9. A support composition, comprising:
    a metal oxide substrate; and
    a coating comprising an organosilane polymer and having an improved durability, the organosilane polymer bonded to a portion of the substrate through at least 3 attachment points.

10. A chromatographic support composition, comprising:
    a silica substrate; and
    a polycarbosilane derived from an alkyl or aromatic substituted monomer containing a leaving group selected from halogens, triflates, alkoxy, acyl, oximes, amines, amine salts, or combinations or mixtures thereof, the polycarbosilane bonded to the silica substrate through at least three attachment points.

11. A support composition made by the method comprising:
    providing a metal oxide substrate; and
    bonding a coating to a portion of the substrate through at least three attachment points, the coating comprising an organosilane polymer derived from an alkyl or aromatic substituted monomer containing a leaving group selected from halogens, triflates, alkoxy, acyl, oximes, amines, amine salts, or combinations or mixtures thereof.

12. A chromatographic support composition, comprising:
    a silica substrate; and
    a polydentate silane of the formula (I) bonded to a portion of the silica substrate

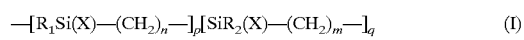

wherein $R_1$ is an alkyl or aryl group having from 1 to 30 carbon atoms, $R_2$ is an alkyl or aryl group having from 1 to 30 carbon atoms and may be the same or different than $R_1$, $R_1$ or $R_2$ include a functional group similar to —$(CH_2)_3$—$N^+Cl^-$, —$(CH_2)_2$—$C_6H_4$—$(CH_2)_3$—$CH_6H_4$—$SO_3H$, —$(CH_2)_3$—O—$CH_2$—CHOH—$CH_2OH$, —$(CH_2)_3NH_2$, and —$(CH_2)_3$—CN, n is an integer from 1 to 10, m is an integer from 1 to 10, p and q are integers from 0 to 100 (except where p+q=2 or 0), and X is a leaving group.

13. The support composition of claim 12, wherein the leaving group of the polydentate silane is seleted from halogens, triflates, alkoxy, acyl, oximes, amines, amine salts, or combinations or mixtures thereof.

14. A method of making a metal oxide material, comprising:
    providing a metal oxide substrate; and
    bonding a coating to a portion of the metal oxide substrate through at least three attachment points, the coating comprising an organosilane polymer and having an improved durability.

15. The method of claim 14, the organosilane comprising a polycarbosilane compound derived from an alkyl substituted or aromatic substituted monomer containing a leaving group selected from halogens, triflates, alkoxy, acyl, oximes, amines, amine salts, or combinations or mixtures thereof.

16. The method of claim 14, wherein the coating is very stable against hydrolytic cleavage conditions.

17. The method of claim 14, wherein the metal oxide is silica, titania, zirconia, or a combination thereof.

18. The method of claim 17, wherein the metal oxide is used as a packing material or a support material in chromatography.

19. The method of claim 15, including providing the coating by bonding the monomer to the substrate and then polymerizing the monomer.

20. The method of claim 15, including providing the coating by polymerizing the monomer and then bonding the polymer to the substrate.

21. The method of making a chromatographic support composition, comprising:

providing a silica substrate; and bonding a coating to a portion of the silica substrate through at least three attachment points, the coating comprising a polycarbosilane compound derived from an alkyl or aromatic substituted monomer containing a leaving group selected from halogens, triflates, alkoxy, acyl, oximes, amines, amine salts, or combinations or mixtures thereof.

22. The method of claim 21, including providing the coating by bonding the monomer to the substrate and then polymerizing the monomer.

23. The method of claim 21, including providing the coating by polymerizing the monomer and then bonding the polymer to the substrate.

24. A method of making a coating comprising a polydentate silane of the formula (I)

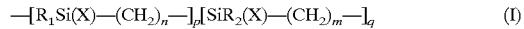

(I)

wherein $R_1$ is an alkyl or aryl group having from 1 to 30 carbon atoms, $R_2$ is an alkyl or aryl group having from 1 to 30 carbon atoms and may be the same or different than $R_1$, $R_1$ or $R_2$ include a functional group similar to —$(CH_2)_3$—$N^+Cl^-$, —$(CH_2)_2$—$C_6H_4$—$(CH_2)_3$—$C_6H_4$—$SO_3H$, —$(CH_2)_3$—O—$CH_2$—CHOH—$CH_2OH$, —$(CH_2)_3$—$NH_2$, and —$(CH_2)_3$—CN, n is an integer from 1 to 10, m is an integer from 1 to 10, p and q are integers from 0 to 100 (except where p+q=or 0), and X is a leaving group, the method comprising:

providing a metal oxide substrate;

providing a coating on a portion of the substrate using a monomer containing a leaving group selected from halogens, triflates, alkoxy, acyl, oximes, amines, amine salts, or combinations or mixtures thereof.

25. The method of claim 24, including providing the coating by bonding the monomer to the substrate and then polymerizing the monomer.

26. The method of claim 24, including providing the coating by polymerizing the monomer and then bonding the polymer to the substrate.

27. A chromatography system containing a support material comprising:

a metal oxide substrate; and a coating comprising an organosilane polymer and having an improved durability, the organosilane polymer bonded to a portion of the substrate through at least 3 attachment points.

28. A method of using a chromatographic support material, comprising:

providing a support material including a metal oxide substrate and a coating comprising an organosilane polymer and having an improved durability, the organosilane polymer bonded to a portion of the substrate through at least 3 attachment points; and using the support material in a chromatography column to analyze the composition of an unknown material.

29. A chromatographic apparatus, comprising a support material including a metal oxide substrate and a coating comprising an organosilane polymer and having an improved durability, the organosilane polymer bonded to a portion of the substrate through at least 3 attachment points.

* * * * *